United States Patent
Coyne et al.

(10) Patent No.: US 11,305,895 B1
(45) Date of Patent: Apr. 19, 2022

(54) SELF-PRESERVED AMPHIBIOUS LANDING OF SPACE HARDWARE

(71) Applicant: UNITED LAUNCH ALLIANCE, L.L.C., Centennial, CO (US)

(72) Inventors: Brendan M. Coyne, Aurora, CO (US); James Lampariello, Newcastle, WA (US); Daniel A. Wehrwein, Aurora, CO (US)

(73) Assignee: United Launch Alliance, L.L.C., Centennial, CO (US)

( * ) Notice: Subject to any disclaimer, the term of this patent is extended or adjusted under 35 U.S.C. 154(b) by 58 days.

(21) Appl. No.: 16/800,004

(22) Filed: Feb. 25, 2020

Related U.S. Application Data

(63) Continuation of application No. 15/918,078, filed on Mar. 12, 2018, now Pat. No. 10,569,908.

(60) Provisional application No. 62/633,398, filed on Feb. 21, 2018.

(51) Int. Cl.
  B64G 1/00 (2006.01)
  B64G 1/62 (2006.01)

(52) U.S. Cl.
  CPC .............. B64G 1/002 (2013.01); B64G 1/62 (2013.01)

(58) Field of Classification Search
  CPC .......... B64G 1/002; B64G 1/62; B64G 1/645; B64G 2001/1071
  See application file for complete search history.

(56) References Cited

U.S. PATENT DOCUMENTS

| | | | | |
|---|---|---|---|---|
| 3,907,225 A | * | 9/1975 | Welther | B64G 1/1085 244/173.3 |
| 6,158,693 A | * | 12/2000 | Mueller | B64D 17/78 244/158.9 |
| 7,834,859 B2 | | 11/2010 | Wainfan et al. | |
| 8,393,582 B1 | * | 3/2013 | Kutter | B64G 1/402 244/172.3 |
| 10,569,908 B1 | | 2/2020 | Coyne et al. | |
| 2006/0049316 A1 | * | 3/2006 | Antonenko | F42B 15/10 244/171.3 |
| 2007/0012821 A1 | * | 1/2007 | Buehler | B64G 1/402 244/171.9 |
| 2011/0017872 A1 | * | 1/2011 | Bezos | B64G 1/62 244/158.9 |
| 2016/0280399 A1 | * | 9/2016 | Tkach | B64G 1/62 |

OTHER PUBLICATIONS

Gravlee et al., "Partial Rocket Reuse Using Mid-Air Recovery," AIAA Space 20078 Conference and Exposition, No. AIAA2008-7874, dated Sep. 9-11, 2008, 11 pages.
Ragab et al., "Launch Vehicle Recovery and Reuse," Am. Inst. Aeronautics and Astronautics, 2015, 10 pages.
Notice of Allowance for U.S. Appl. No. 15/918,078, dated Oct. 17, 2019, 9 pages.

\* cited by examiner

*Primary Examiner* — Assres H Woldemaryam
(74) *Attorney, Agent, or Firm* — Sheridan Ross P.C.

(57) ABSTRACT

A method for preserving and recovering the main engine of the first stage of a multistage launch vehicle involves utilizing a portion of a first stage propellant tank together with a parachute and a deployed buoyancy device to float the engine in a body of water until the engine can be recovered. Controlled explosions remove portions of the propellant tank to permit it to stabilize the position of the engine relative to the water following splash down.

16 Claims, 8 Drawing Sheets

SELF-PRESERVED AMPHIBIOUS LANDING OF SPACE HARDWARE

CROSS-REFERENCE TO RELATED APPLICATIONS

This application is a continuation and claims the benefit of U.S. patent application Ser. No. 15/918,078 filed Mar. 12, 2018 (now issued U.S. Pat. No. 10,569,908), which claims the benefit of U.S. Provisional Patent Application Ser. No. 62/633,398, filed Feb. 21, 2018, the entirety of both is incorporated herein by reference.

FIELD OF THE INVENTION

Embodiments of the present disclosure generally relate to hardware, systems and methods for amphibious recovery of launch vehicle hardware. More specifically, embodiments of the present disclosure address the recovery of first stage hardware, including main engines and booster engines.

BACKGROUND OF THE INVENTION

Launch vehicles are expensive. Recovery and reuse of spacecraft and launch vehicles has been an objective for decades. However, the economics of spacecraft and launch vehicle recovery are significant and daunting. NASA's space shuttle is regarded as the first recoverable and reusable spacecraft. Unfortunately, the anticipated savings from reuse did not materialize. Ironically, the space shuttle was retired from service and replaced by one-time use spacecraft.

U.S. Pat. No. 7,834,859, assigned to Northrup Grumman Corporation is directed to a process for recovering a spacecraft first stage. The first stage carries a second stage into space. At a predetermined point, the second stage separates from the first stage and continues on its mission. The first stage engines cease operating, and the first stage falls a substantial distance towards Earth. At this point, the main engines of the first stage reignite and propel the first stage to a distance from Earth greater than the point of separation from the first stage. At this higher elevation, the propellant in the first stage is primarily depleted, the engines are turned off, and the first stage is guided, without power, to land at the launch site. Extra fuel is required to complete this process, adding additional weight to the initial launch.

More recently, SpaceX Corporation has shown it is possible to recover the first stage of a launch vehicle. More specifically, the Falcon 9 provides a controlled recovery of the first stage. Using control systems, including engines, requisite fuel and guidance, the first stage may be guided under power to a land or ship-based landing. While savings are expected from the ability to reuse the first stage, there are added expenses in the cost of the additional systems, including propellant and guidance hardware, that must be carried into space as part of the initial launch in order to be able to recover the first stage for subsequent uses.

SUMMARY OF THE INVENTION

The main engine of a launch vehicle is expensive and is capable of reuse if it can be economically recovered without damage. According to aspects of the present disclosure, a system and method for recovery and reuse of the main engine(s) of a launch vehicle is disclosed. More specifically, one or more parachutes are deployed to decelerate the decent of the first stage and main engine following separation from the second or upper stage. Appropriately sized parachutes and/or parafoils may be used to support the weight of the engine (approximately 18,000 lbs. in one embodiment) and the first stage structure (approximately 45,000 lbs. in one embodiment). At a predetermined altitude, the first section is purposefully severed into two sections. The first section includes the main engine and a portion of at least one propellant tank. The portion of the remaining propellant tank includes a central section of the tank and one closed end. The opposite closed end is severed as part of the process of severing the first stage into two sections. The second section includes a remaining portion of the at least one propellant tank and the opposite end of the first stage. The first section is connected to the parachute system. The second section is allowed to crash into the earth at a safe location. Severing the first stage reduces weight, which assists in slowing the descent of the first section, and also reconfigures the first section for a controlled splash down in a body of water.

Also, at a predetermined altitude or at a predetermined time, a second set of controlled explosions form a series of holes in the fuselage of the first section of the first stage. The holes extend through the wall of the remaining portion of the propellant tank. The second set of explosions may occur following or simultaneous with the first set of explosions that severs the first stage into two sections. The holes play a role in the deceleration of the first section at splash down and the stability and orientation of the first section in the water following splash down. Prior to splash down, the first section is oriented generally vertically with the engine farthest from earth and the open end of the severed open end of the first section closest to earth. Similarly, the remaining portion of the at least one propellant tank is vertically oriented with its closed end located proximate the engine and its severed open end facing the water. Upon splash down, the air within the propellant tanks acts as an air spring, allowing for gradual displacement of the water below the vehicle and pressure buildup within the tank. As water flows into the open end of the propellant tank, air is forced out of the propellant tank through the side holes. Once the water flowing into the tank reaches the level of the side holes, the flow of water into the tank is stopped, and the remaining tank volume above the vented plane acts as a buoyance element.

In addition, and prior to splash down, one or more buoyancy devices are deployed at positions surrounding the main engine. The buoyancy devices may be air filled devices. The buoyancy devices also decelerate the first section upon splash down and maintain the first section afloat following splash down. Also, the water filled portion of the propellant tank acts to stabilize the orientation of the first section with the engine out of the water.

The descent of the first section may be tracked by radar and/or a beacon or other tracking device may be associated with the engine to track its position. Following splash down the engine is readily located and recovered by ship or aircraft.

Optionally, an engine cover may also be deployed to completely cover the engine prior to splash down as a further precaution, or the buoyancy device may completely envelope the engine. Also, the buoyancy device may include deployable arms that act like outriggers to stabilize and orient the engine at a position out of the water.

Unless otherwise indicated, all numbers expressing quantities, dimensions, conditions, and so forth used in the specification and claims are to be understood as being modified in all instances by the term "about." It should also be appreciated that the term "above" as used to describe the relative location of the two tanks is intended to include not just a vertical alignment. Following launch, the position of the launch vehicle may no longer remain vertical but may have other orientations. Here, the relative position of the two tanks is linear or axially aligned.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

The Summary of the Invention is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of the invention.

In certain instances, details that are not necessary for an understanding of the disclosure or that render other details difficult to perceive may have been omitted from the drawings. It should also be understood that in some instances, details may have been added, such as details relating to methods of construction, including for example construction lines and dimensions, to assist in explaining the methods and structures of the preferred embodiments described herein. It should be understood, of course, that the claimed invention is not necessarily limited to the particular embodiments illustrated herein.

DETAILED DESCRIPTION

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

Figure 1:
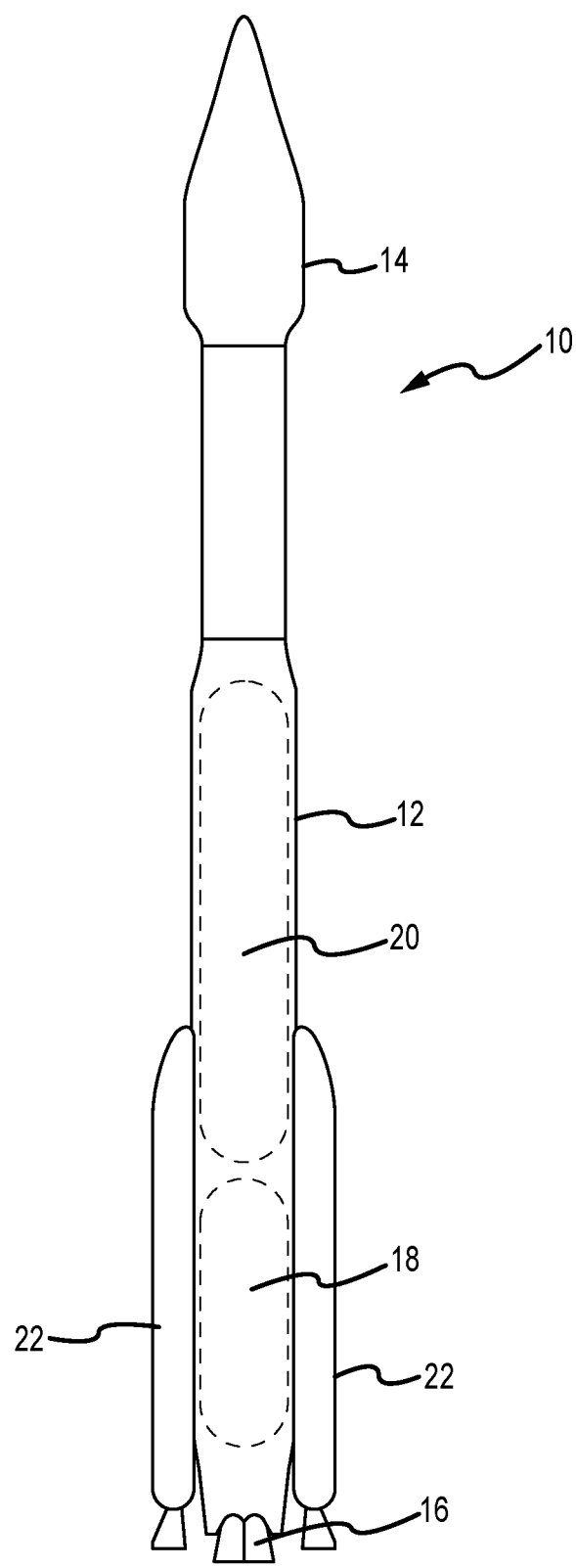
FIG. 1 is an elevation of one embodiment of a launch vehicle, including a first and second stage, and further showing two propellant tanks in phantom as part of the first stage.

Turning to FIG. 1, an exemplary launch vehicle 10 is illustrated. The launch vehicle has a first stage 12 and a second stage 14. The main engine 16 is located at the bottom of the first stage 12 as the launch vehicle is depicted in FIG. 1. The first stage may include one or more main engines. Two propellant tanks 18 and 20 are also identified, although, depending upon the type of engine utilized, a single propellant tank may also be used. As one example, the launch vehicle 10 is an Atlas V and the propellant tanks contain liquid oxygen and RP-1. Booster rockets 22 are also illustrated and may or may not be used to assist in launching the launch vehicle 10 into orbit. The booster rockets may use liquid or solid propellant.

Figure 2:
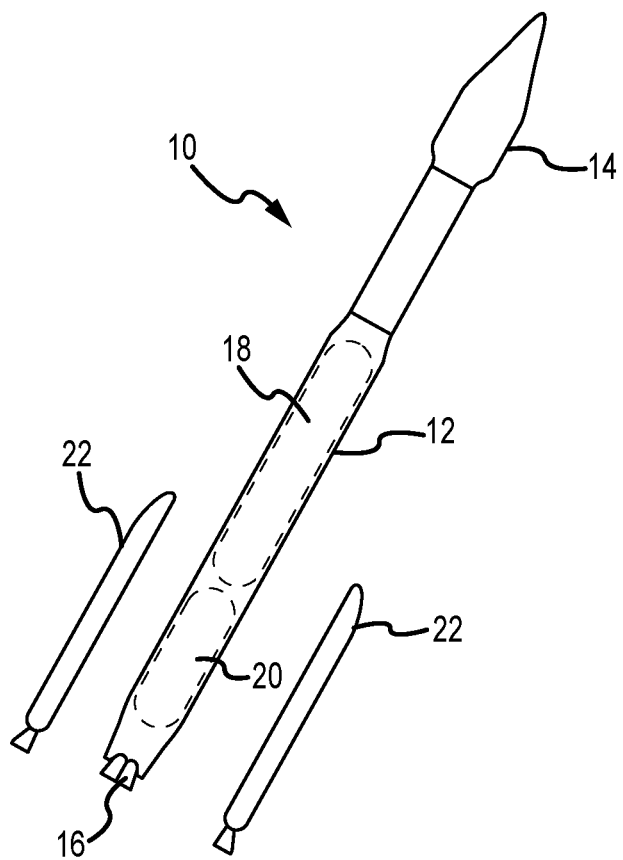
FIG. 2 is an elevation view of the launch vehicle, post launch, with rocket boosters separating from the first stage.

FIG. 2 illustrates the launch vehicle post launch, with the booster rockets 22 separating from the first stage 12. Without intervention, the booster rockets typically would fall to Earth crashing into land or a body of water.

Figure 3:
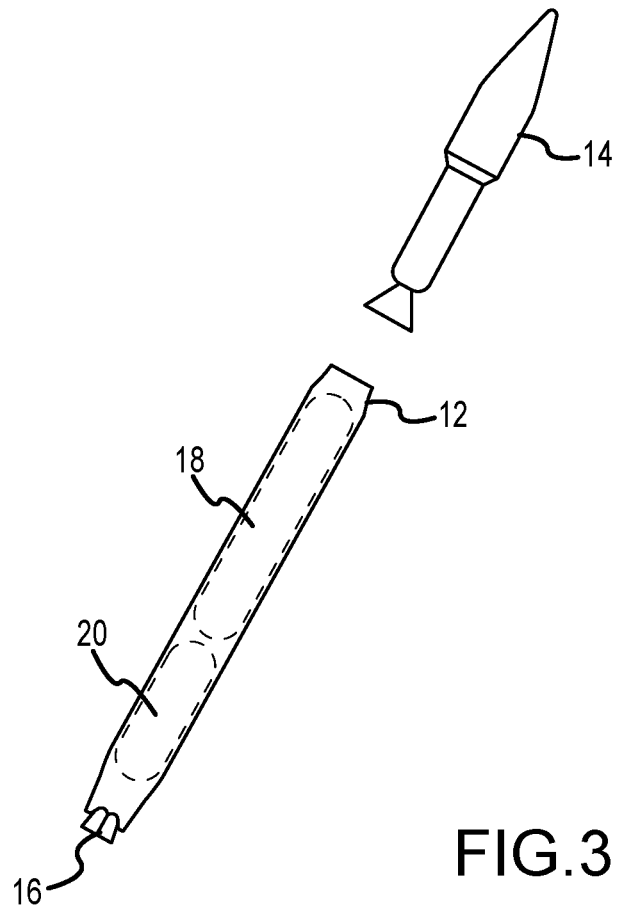
FIG. 3 is an elevation view of the second stage separating from the first stage.

When the launch vehicle 10 reaches a predetermined height or distance from Earth, the main engine 16 ceases operation and the second stage 14 separates from the first stage 12. This is illustrated in FIG. 3. The second stage 14 also includes an engine, propellant and one or more payloads to be deployed in orbit or carried beyond orbit depending upon the mission.

Figures 4, 5:
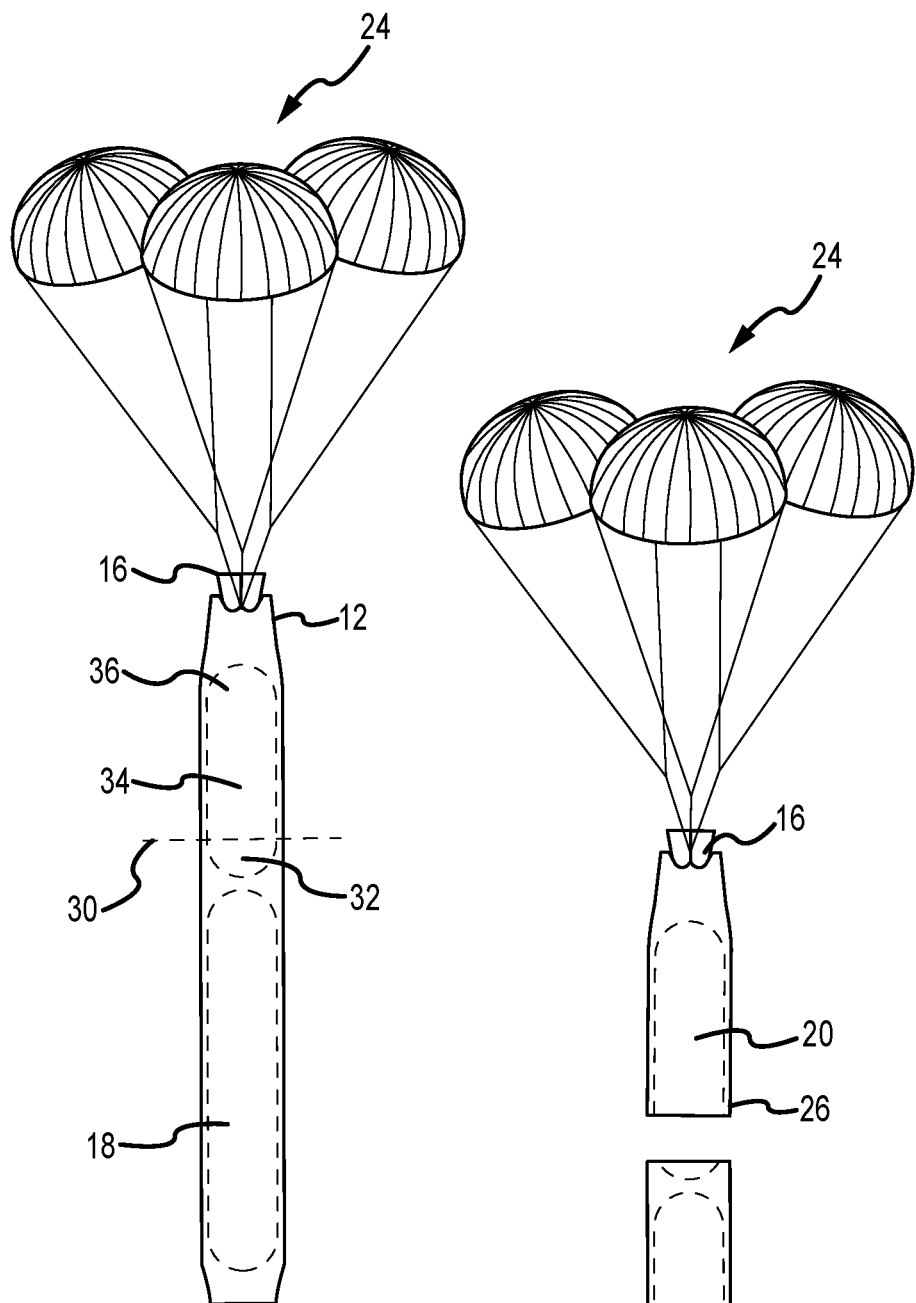
FIG. 4 is an elevation view of the first stage, with parachutes deployed, returning to Earth.
FIG. 5 is an elevation view of the first stage following a controlled explosion that separates the first stage into two portions, with one portion including the main engines.
Figure 6:
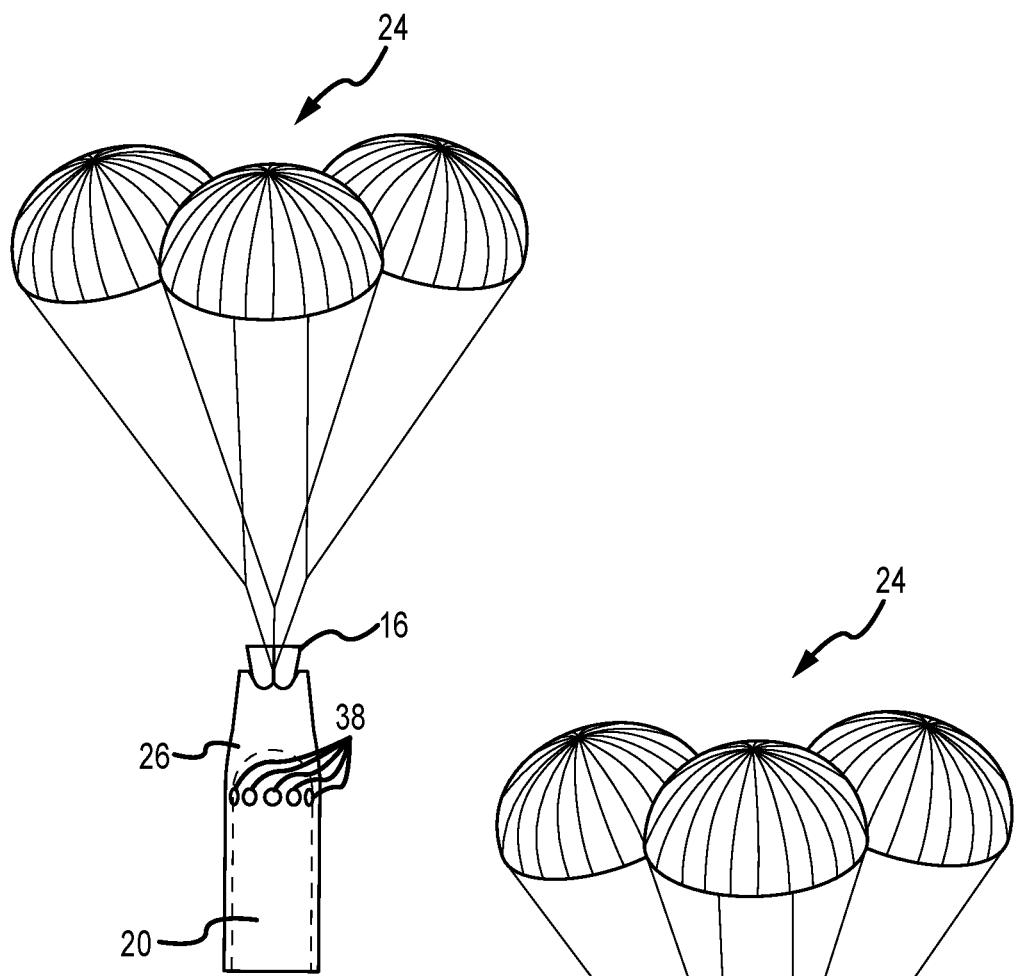
FIG. 6 is an elevation view of the embodiment of FIG. 5, following a second set of controlled explosions that create openings in the body of the first stage proximate the main engines.

Previously, the first stage 12 would fall back to Earth under the influence of gravity and land in the ocean. According to aspects of the present disclosure, one or more parachutes 24 are deployed to control the speed of the descent of the first stage 12 for the purpose of preserving and reusing the first stage. This is illustrated in FIG. 4. With the parachute deployed, the orientation of the first stage has the main engine 16 closest the parachute 24 and the opposite end of the first stage 12 oriented closest to Earth. The booster rockets optionally may be fitted with a parachute system for a controlled landing with the objective to reuse them. At a predetermined altitude or time, a series of controlled explosions severs the first stage 12 into a first section 26, including the engine 16 and a second section 28. The second section 28 falls to Earth, typically crashing in the ocean for safety purposes. With reference to FIG. 4, the dashed line 30 notes the preferred location of where the first section 26 separates from the second section 28. More specifically, the domed end 32 of the first propellant tank 18 is also severed, together with the outer fuselage of the first stage, leaving the main body 34 of the first propellant tank 18 and the opposite domed end 36 as part of the first section 26.

At another predetermined altitude or time, a second series of explosions form a plurality of holes 38 in the outer skin or fuselage 40 of the first section 26 of the first stage 12, and in the main body 34 of the first propellant tank 18 proximate where the main body 34 and domed end 36 are joined.

Figure 7:
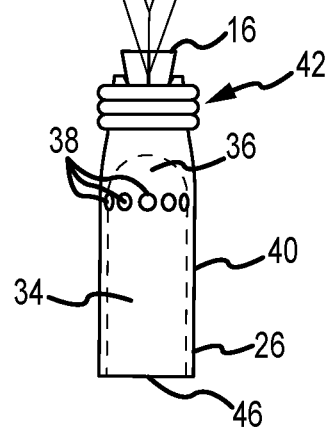
FIG. 7 is an elevation view of the embodiment of FIG. 6, further showing the deployment of buoyancy devices.

At another predetermined altitude or time, one or more buoyancy devices 42 are deployed from the first stage 12. One example of a buoyancy device 42 is illustrated in FIG. 7. As illustrated, the buoyancy device 42 comprises one or more inflated rings 44 that surround the main engine 16. The buoyancy device 42 is not limited to the embodiment as illustrated but may take on any shape and size adequate to maintain the first section 26 of the first stage 12 in a generally upright position, with the engine 16 out of the water, following splash down of the first section 26 in the ocean.

Figure 8:
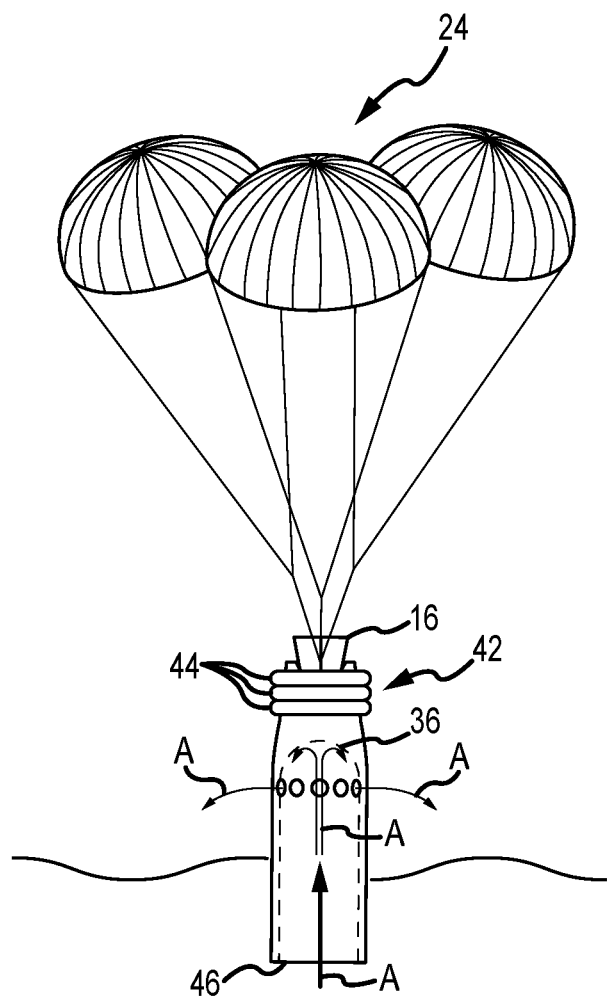
FIG. 8 is an elevation view of the embodiment of FIG. 7 at the point of splash down in a body of water.

FIG. 8 illustrates a model of what occurs at splash down. The severed end 46 of the first section 26 is open. Because of the generally vertical orientation of the first section 26 upon splash down, with the engine furthest from the water and the open end of the first section 26 and first propellant tank 18 facing the water, water fills the propellant tank 18. The holes 38 allow air in the tank 18 to escape as the first section 26 enters the water. The holes 38 control the rate at which the air is allowed to escape which causes the air to act as a spring or cushion to retard the sinking of the first section 26. The arrows A depict the path of the air. The interaction of the air and the domed end 36 of the first tank 18 acts to redirect the air to brake or retard the downward travel of the first section 26. Air trapped in the dome impedes the depth to which the first section 26 sinks into the water upon splash down. The buoyancy device 42 also impedes the extent to which the first section 26 submerges upon splash down. Once in the water, the remaining portion of the first propellant tank 18 below the holes 38 is filled with water to stabilize the orientation of the first section 26 with the engine 16 out of the water. The tank 18 traps a sufficient volume of water for stabilization purposes. The holes 38 allow water to enter and exit the trapped volume while the air trapped in the dome and the buoyancy device 42 provide flotation and additional support.

Figure 9:
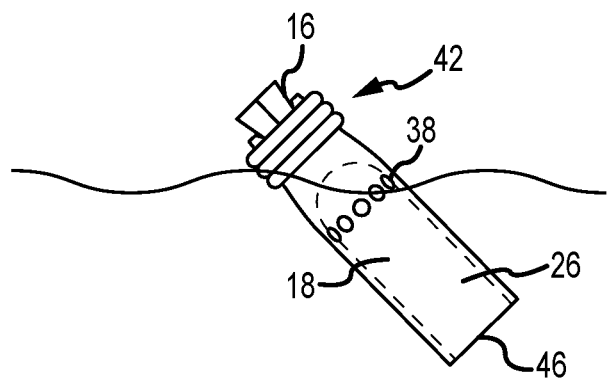
FIG. 9 is an elevation view of the embodiment of FIG. 8 following splash down in a body of water.

FIG. 9 illustrates the first section 26 following splash down. The parachute 24 has collapsed and the buoyancy device 42 maintains the engine 16 in a position out of the water. The location of the first section 26 is readily tracked on radar and/or by a transmitter associated with the engine. Reconnaissance ships or aircraft can quickly locate, secure and recover the first section 26, including the engine(s) 16. The parachutes 24 sufficiently slow the descent to minimize impact upon splash down and thereby reduce or eliminate damage to the engine upon splash down. Damage to the first section 26 and the remaining portion of the propellant tank 18 is expected. The buoyancy device 42 and the reconfigured first section 26 of the first stage maintain the engine 16 in a positive and generally dry condition relative to the water further reducing possible damage to the engine from the water.

Figure 10A:
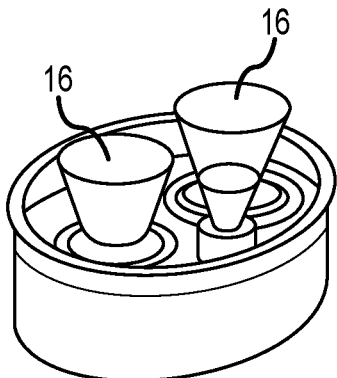
FIGS. 10A-10C are a series of prospective views that illustrate the deployment of one embodiment of a protective cover over the main engine(s).
Figure 10B:
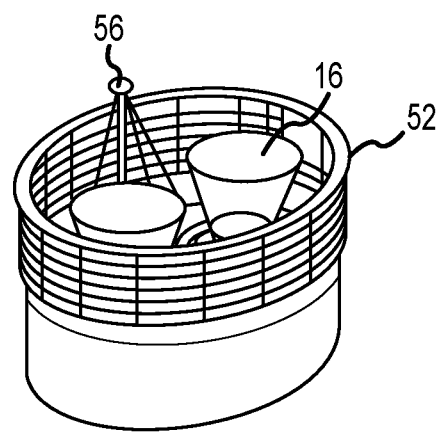
Figure 10C:
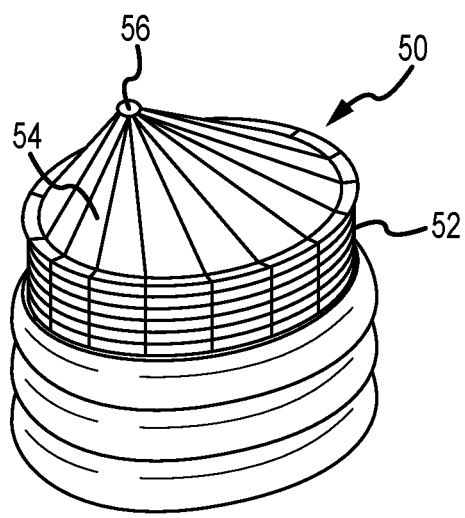
Figure 11:
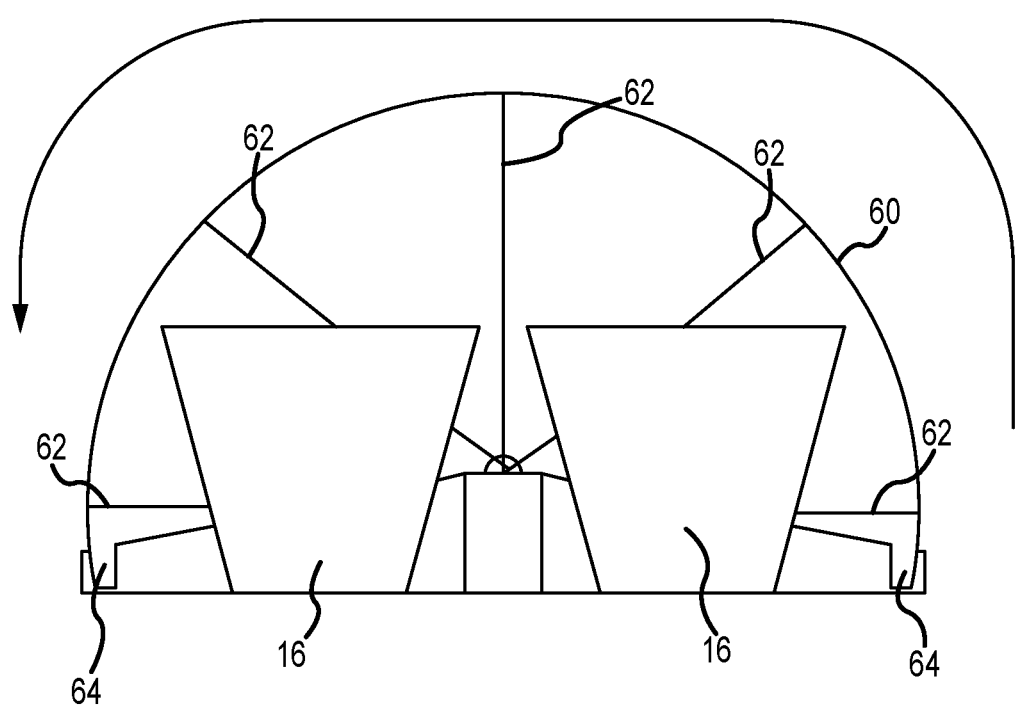
FIG. 11 is a plan view of another embodiment of a protective cover for the engine(s).
Figure 12:
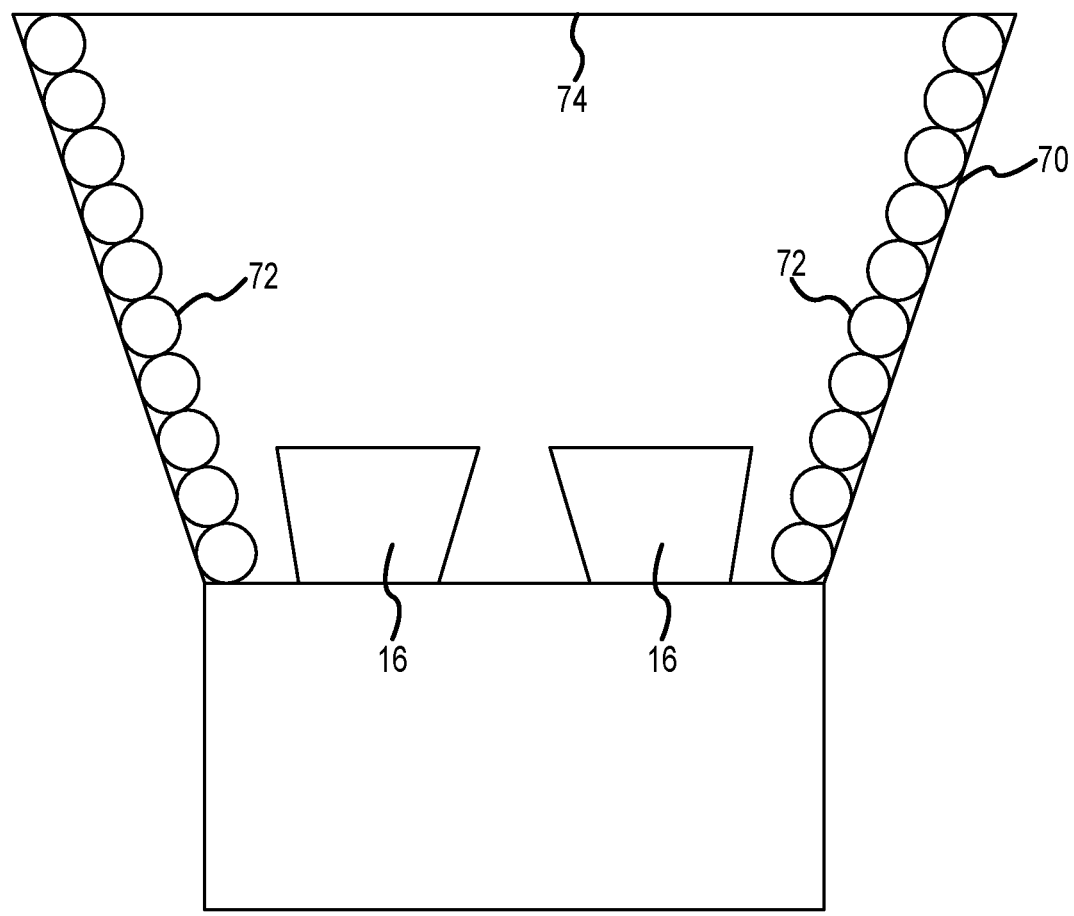
FIG. 12 is a plan view of another embodiment of a protective cover for the engine(s).

Optionally, and according to aspects of the present disclosure, a protective shield 50 may be deployed to partially or fully cover or enclose the engine 16 further limiting contact with the water. In a first embodiment, a protective cover is deployed from a stowed position (FIG. 10A) on the engine section of the vehicle, and would be deployed using either mechanical, pneumatic means in conjunction with an electrical or ordnance system. For example, a mechanical deployment could include (but is not limited to) spring loaded structural support members deployed by releasing the spring energy with use of an ordnance or electrical retaining device. A pneumatic or other device could similarly be used to deploy the protective shield. In one embodiment, the protective shield 50 consists of a deployable cylindrical member with structural members which are used to deploy the cover from the stowed/packed position. The structural or frame members that assist in deployment may also support the flexible member after deployment. As one example, in FIG. 10B a cylindrical sleeve 52 is deployed. As one example, the structural members may be a compressed coils spring that expands when deployed. As shown in FIG. 10C, a cover 54 may then be deployed and maintained in place by structural member 56 to enclose the engines 16. In FIG. 10C, the cylindrical sleeve 52 is cinched closed to protect the engine. The cinching action may be accomplished by using energy stored in a spring motor(s) to close the cover. In another embodiment a cover stowed in position over half the circumference of the engine section is deployed in a rotational direction about the centerline of the engine section. Spring motors or other deployment mechanisms may be used. An example of this is illustrated in FIG. 11. The cover 60 would consist of structural members 62 to assist in deployment and to hold the shape when deployed. The cover 60 would nest in a recess 64 on the engine section aft end in order to provide water-tight protection to the engine(s). In a third embodiment, illustrated in FIG. 12, a pneumatic solution would be nearly identical to the embodiment depicted in FIG. 10A-C but involve stowed inflatable members actuated/inflated pneumatically instead of a flexible cover deployed mechanically. The inflatable members would provide protection of the engines and maintain shape without the need for structural support members. A spring motor(s) and drawstring or secondary inflatable device would provide coverage over the engine bells. FIG. 12 shows one example of such a shield 70. A series of circular tubes 72 deployed from the aft area of the engine 16 extend axially beyond the engines 16. A cover 74 is then deployed to close the opening in the shield 70. The cover 74 could be closed by a drawstring activated by spring motors.

The various embodiments of methods, devices, and systems used to interconnect or join two components under large forces and possible shocks have been described herein in detail. Such interconnection or joint systems and devices are capable of being designed and constructed using other methods and of being practiced or of being carried out in various ways as will be readily understood by those of skill in the art upon review of the present disclosure. Such modifications and alterations of those embodiments as will occur to those skilled in the art upon review of the present disclosure are within the scope and spirit of the claimed invention, as set forth in the following claims. In addition, it is to be understood that the phraseology and terminology used herein is for the purpose of description and should not be regarded as limiting.

What is claimed is:

1. A method for returning a launch vehicle main engine to earth, comprising:
   launching a launch vehicle from a launch site, the launch vehicle having a first stage and a second stage, the first stage comprising:

a first end;
a second end;
a main engine proximate the second end;
a fuselage; and
a propellant tank positioned within the fuselage, the propellant tank having a central section, a first closed end, and a second closed end;
terminating operation of the main engine;
separating the first stage from the second stage;
deploying at least one parachute from the first stage;
causing the first stage to separate into at least two sections, wherein a first section includes the main engine, a portion of the fuselage, and a portion of the propellant tank comprising the central section and the first closed end, and wherein a second section includes an end portion of the propellant tank comprising the second closed end, wherein the at least one parachute is connected to the first section;
forming a plurality of apertures extending through the portion of the fuselage of the first section and the portion of the propellant tank remaining with the first section; and
landing the first section of the first stage including the main engine in a body of water.

2. The method of claim 1 wherein the propellant tank comprises a main body portion, a first end portion affixed to one end of the main body proximate the engine and a second end portion fixed to the opposite end of the main body, and wherein causing a portion of the first stage including at least a portion of a propellant tank to separate from the remainder of the first stage comprises separating the second end portion of the propellant tank from the main body.

3. The method of claim 2, wherein the plurality of apertures is formed proximate the location where the main body of the propellant tank is joined to the first dome portion.

4. The method of claim 2, wherein the plurality of apertures is formed before the first stage is separated into at least two sections.

5. The method of claim 1, wherein deploying a buoyancy device comprises inflating a buoyancy device.

6. The method of claim 1, wherein deploying the at least one parachute orients the first stage such that the second end of the first stage is farther from the earth than is the first end of the first stage.

7. The method of claim 1, wherein the parachute is at least one parafoil.

8. The method of claim 1, further comprising tracking the location of the first section of the first stage.

9. The method of claim 8, further comprising recovering the main engine.

10. The method of claim 1, further comprising deploying a cover over the main engine.

11. The method of claim 1, further comprising at least one booster rocket associated with the first stage, separating the at least one booster rocket from the first stage, and deploying at least one parachute associated with the at least one booster rocket.

12. A method for returning a launch vehicle engine to earth, comprising:
providing a launch vehicle comprising:
a fuselage;
an engine positioned at a first end of the fuselage; and
a propellant tank disposed within the fuselage;
terminating operation of the engine;
separating a first section from the fuselage, the first section comprising the engine and a portion of the propellant tank having a closed end;
creating a severed open end of the first section when separating the first section, wherein the engine is positioned opposite the severed open end;
deploying a buoyancy device proximate the engine;
landing the first section of the fuselage including the engine in a body of water such that the severed open end contacts the body of water first; and
controlling the flow of air from the portion of the propellant tank following landing the first section in the body of water.

13. The method of claim 12 wherein controlling the flow of air from the at least a portion of the propellant tank comprises forming a plurality of apertures extending through the fuselage of the first section and the portion of the propellant tank remaining with the first section.

14. The method of claim 12 wherein the launch vehicle comprises a first stage and a second stage, and the fuselage, at least one engine and at least one propellant tank are part of the first stage, further comprising separating the second stage from the first stage prior to deploying the at least one parachute.

15. The method of claim 12 further comprising deploying a cover to shield the at least one engine from water.

16. A method for returning a launch vehicle main engine to earth, comprising:
launching a launch vehicle from a launch site, the launch vehicle having a first stage and a second stage, the first stage comprising:
a first end;
a second end;
a main engine proximate the second end;
a fuselage; and
a propellant tank positioned within the fuselage, the propellant tank having a central section, a first closed end, and a second closed end;
terminating operation of the main engine;
separating the first stage from the second stage;
deploying at least one parachute from the first stage;
causing the first stage to separate into at least two sections, wherein a first section includes the main engine, a portion of the fuselage, and a portion of the propellant tank comprising the central section and the first closed end, wherein a second section includes an end portion of the propellant tank comprising the second end, and wherein the at least one parachute is connected to the first section;
creating a severed open end of the first section when separating the first stage into the at least two sections;
orienting the first section generally vertically with the main engine farthest from earth, the first closed end of the propellant tank positioned proximate the main engine, and the severed open end of the first section positioned closest to earth; and
landing the first section of the first stage including the main engine in a body of water.

* * * * *